(12) United States Patent
Webb et al.

(10) Patent No.: US 7,276,336 B1
(45) Date of Patent: *Oct. 2, 2007

(54) METHODS OF FABRICATING AN ADDRESSABLE ARRAY OF BIOPOLYMER PROBES

(75) Inventors: Peter G. Webb, Menlo Park, CA (US); Michael P. Caren, Palo Alto, CA (US); Kyle J. Schleifer, Cupertino, CA (US); Jay K. Bass, Mountain View, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/359,527

(22) Filed: Jul. 22, 1999

(51) Int. Cl.
*C12Q 1/68* (2006.01)
*C12M 1/36* (2006.01)
*G01N 15/06* (2006.01)
*B01L 3/02* (2006.01)

(52) U.S. Cl. ............ 435/6; 435/283.1; 435/287.2; 435/288.7; 422/68.1; 422/100

(58) Field of Classification Search ............ 435/6; 536/23.1
See application file for complete search history.

(56) References Cited

U.S. PATENT DOCUMENTS

| | | | |
|---|---|---|---|
| 4,328,504 A | 5/1982 | Weber et al. | |
| 4,675,696 A * | 6/1987 | Suzuki | 346/46 |
| 5,449,754 A | 9/1995 | Nishioka | |
| 5,554,339 A | 9/1996 | Cozzette et al. | 422/50 |
| 5,807,522 A | 9/1998 | Brown et al. | |
| 5,843,655 A | 12/1998 | McGall | |
| 5,874,214 A | 2/1999 | Nova et al. | |
| 5,981,733 A | 11/1999 | Gamble et al. | |
| 5,984,470 A * | 11/1999 | Sakino et al. | 347/106 |
| 6,001,309 A | 12/1999 | Gamble et al. | |
| 6,015,880 A * | 1/2000 | Baldeschwieler et al. | 530/333 |
| 6,140,044 A | 10/2000 | Besemer et al. | |
| 6,558,623 B1 | 5/2003 | Ganz et al. | |
| 6,939,673 B2 * | 9/2005 | Bass et al. | 435/6 |
| 6,943,036 B2 * | 9/2005 | Bass | 436/180 |
| 6,998,230 B1 * | 2/2006 | Schantz et al. | 435/6 |
| 7,027,629 B2 * | 4/2006 | Cattell et al. | 382/128 |

FOREIGN PATENT DOCUMENTS

| | | |
|---|---|---|
| EP | 0 717 113 | 6/1996 |
| EP | 0 895 082 | 2/1999 |
| EP | 1 048 723 | 11/2000 |
| WO | WO 89/10977 | * 11/1989 |
| WO | WO 95/25116 | 9/1995 |
| WO | WO 98/41531 | 9/1998 |
| WO | WO 98/43817 | 10/1998 |
| WO | WO 98/47006 | 10/1998 |
| WO | WO 99/05308 | 2/1999 |
| WO | WO 99/34931 | 7/1999 |
| WO | WO 00/34523 | 6/2000 |
| WO | WO 00/60425 | 10/2000 |

OTHER PUBLICATIONS

Budach et al., "Planar Waveguides as High-Performance Sensing Platforms for Fluorescence-Based Multiplexed Oligonucleotide Hybridization Assays" Analytical Chemistry vol. 71, 3347-3355, 1999.*
Instruction Page, "Programmable Error Connection PKE 80", RSF Electronik, Rancho Cordova, CA, undated.
"BioChip Arrayer: Automated DNA Microarray Fabrication", http://www.packardinst.com/prod_serv/biochiparrayer.htm, Packard Instrument Company, 1999, 3 pp.
"Press Release: New Options Optimize Arraying-Technology", http://www.packardinst.com/pr/pr899-2.htm, Packard Instrument Company, Aug. 1, 1999, 2 pp.

* cited by examiner

*Primary Examiner*—BJ Forman
(74) *Attorney, Agent, or Firm*—Gordon M. Stewart

(57) ABSTRACT

A method of fabricating an addressable array of biopolymer probes on a substrate according to a target array pattern using a deposition apparatus, and a deposition apparatus which can execute the method and computer program products for the apparatus. The deposition apparatus which, when operated according to a target drive pattern based on nominal operating parameters of the apparatus, provides the probes on the substrate in the target array pattern. The method includes examining at least one operating parameter for an error from a nominal value which error will result in use of the target drive pattern producing a discrepancy between the target array pattern and an actual array pattern deposited. When an error is detected deriving, based on the error, a corrected drive pattern different from the target drive pattern such that use of the corrected drive pattern results in a reduced discrepancy between the target and actual array patterns.

19 Claims, 3 Drawing Sheets ically involve depositing biopolymers at predetermined locations on a substrate which are suitably activated such that the biopolymers can link thereto. Biopolymers of different sequence may be deposited at different regions of the substrate to yield the completed array. Washing or other additional steps may also be used.

METHODS OF FABRICATING AN ADDRESSABLE ARRAY OF BIOPOLYMER PROBES

FIELD OF THE INVENTION

This invention relates to arrays, particularly polynucleotide arrays such as DNA arrays, which are useful in diagnostic, screening, gene expression analysis, and other applications.

BACKGROUND OF THE INVENTION

Polynucleotide arrays (such as DNA or RNA arrays), are known and are used, for example, as diagnostic or screening tools. Such arrays include regions (sometimes referenced as features) of usually different sequence polynucleotides arranged in a predetermined configuration on a substrate. The arrays, when exposed to a sample, will exhibit an observed binding pattern. This binding pattern can be detected, for example, by labeling all polynucleotide targets (for example, DNA) in the sample with a suitable label (such as a fluorescent compound), and accurately observing the fluorescence pattern on the array. Assuming that the different sequence polynucleotides were correctly deposited in accordance with the predetermined configuration, then the observed binding pattern will be indicative of the presence and/or concentration of one or more polynucleotide components of the sample.

Biopolymer arrays can be fabricated using either in situ synthesis methods or deposition of the previously obtained biopolymers. The in situ synthesis methods include those described in U.S. Pat. No. 5,449,754 for synthesizing peptide arrays, as well as WO 98/41531 and the references cited therein for synthesizing polynucleotides (specifically, DNA). Such in situ synthesis methods can be basically regarded as iterating the sequence of depositing droplets of: (a) a protected monomer onto predetermined locations on a substrate to link with either a suitably activated substrate surface (or with a previously deposited deprotected monomer); (b) deprotecting the deposited monomer so that it can now react with a subsequently deposited protected monomer; and (c) depositing another protected monomer for linking. Different monomers may be deposited at different regions on the substrate during any one iteration so that the different regions of the completed array will have different desired biopolymer sequences. One or more intermediate further steps may be required in each iteration, such as oxidation and washing steps. The deposition methods basi- Typical procedures known in the art for deposition of polynucleotides, particularly DNA such as whole oligomers or cDNA, are to load a small volume of DNA in solution in one or more drop dispensers such as the tip of a pin or in an open capillary and, touch the pin or capillary to the surface of the substrate. Such a procedure is described in U.S. Pat. No. 5,807,522. When the fluid touches the surface, some of the fluid is transferred. The pin or capillary must be washed prior to picking up the next type of DNA for spotting onto the array. This process is repeated for many different sequences and, eventually, the desired array is formed. Alternatively, the DNA can be loaded into a drop dispenser in the form of an inkjet head and fired onto the substrate. Such a technique has been described, for example, in PCT publications WO 95/25116 and WO 98/41531, and elsewhere. This method has the advantage of non-contact deposition. Still other methods include pipetting and positive displacement pumps such as the Biodot equipment (available from Bio-Dot Inc., Irvine Calif., USA).

In array fabrication, the quantities of DNA available for the array are usually very small and expensive. Sample quantities available for testing are usually also very small and it is therefore desirable to simultaneously test the same sample against a large number of different probes on an array. These conditions require use of arrays with large numbers of very small, closely spaced features. It is important in such arrays that features actually be present, that they are put down accurately in the desired pattern, are of the correct size, and that the DNA is uniformly coated within the feature. Normally, in an automated apparatus the features are deposited according to a target array pattern. A target drive pattern is created from the target array pattern, which target drive pattern contains the instructions for driving the various components so as to provide the probes on the substrate in the target array pattern. The target drive pattern is created on the assumption that all components of the deposition apparatus are in their expected or normal ("nominal") positions and operating according to nominal parameters.

However, the present invention realizes that every component in an array deposition apparatus is subject to variances in its parameters within, or sometimes even outside of, normal tolerances for such component. For example, a dispensing head used to dispense fluid droplets to form the array, may have jets which vary slightly in the size of the droplets dispensed, the orientation of the jets with respect to one another, or the orientation of the head itself in the apparatus may be slightly off from a nominal position. While such variances can be reduced by constructing a dispensing apparatus with components of higher tolerance (that is, less variation), this can increase cost. Furthermore, the present invention realizes that while a given set of parameters may exist during manufacture of a given batch of arrays, these parameters may change over time. For example, thermal expansion or of components or slight displacement of them from their original positions over long periods of operation, leads to variance in position parameters. These effects result in use of the target drive pattern not producing the target array on the substrate. That is, there is a discrepancy between the target array pattern and the actual array pattern deposited. Such discrepancy may include mislocation of features, or features not being of the correct size. These discrepancies can occur in each cycle of the in situ process, or during deposition of presynthesized polynucleotides.

It would be useful then, to provide a means by which arrays can be fabricated with an actual array pattern which is close to the target array pattern. It would also be useful if such means was relatively reliable and not overly costly.

SUMMARY OF THE INVENTION

The present invention then, provides in one aspect, a method of fabricating an addressable array of biopolymer probes on a substrate according to a target array pattern, using a deposition apparatus. The deposition apparatus, when operated according to a target drive pattern based on nominal operating parameters of the apparatus, provides the probes on the substrate in the target array pattern. The method includes examining at least one operating parameter of the apparatus for an error from a nominal value which error will result in use of the target drive pattern producing a discrepancy between the target array pattern and an actual array pattern deposited. When an error is detected, a corrected drive pattern different from the target drive pattern is derived, based on the error, such that use of the corrected drive pattern results in a reduced discrepancy between the target and actual array patterns.

The method may also include operating the deposition apparatus according to the corrected drive pattern. Furthermore, the present invention can be used to deposit different types of biopolymers or even other different chemical moieties, including peptides and polynucleotides such as DNA or RNA. Thus, various additional embodiments of the invention can be described by replacing biopolymer probes in the descriptions herein, with moieties. The target drive pattern can initially be saved in a memory of the deposition apparatus, and the corrected drive pattern can also optionally be saved in the memory (for example, either after or during its derivation). In one particular construction, the deposition apparatus includes a dispensing head to dispense fluid droplets containing the probes or probe precursors (for example, monomers), and a transport system to move at least one of the dispensing head and substrate relative to the other as the droplets are dispensed from the head, so as to form the array. In this case, the drive pattern controls operation of the transport system. The saving of the corrected drive pattern may, for example, be done prior to operating the dispensing apparatus. As an alternative, the corrected drive pattern may be derived by modifying, based on the detected error, instructions to at least one deposition apparatus component based on the target drive pattern during deposition of the probes to form the array. For example, an instruction based on the target drive pattern may be sent to the foregoing dispensing head but that instruction is modified, before actually driving the head in some manner, based on the detected error. In this arrangement then, the corrected drive pattern is derived during apparatus operation.

The at least one operating parameter can be selected from one or more of any parameter which would affect the actual array pattern deposited. For example, these may include: a position of the dispensing head or any other dispensing apparatus component; the accuracy of an encoder used to detect the position of the dispensing head or the substrate; the accuracy in an ability of the transport system to move the substrate or head to an expected location in response to a command (for example, deviation of actual movement from a corresponding nominal axis of movement); or the position of a position of a nozzle in a multiple nozzle dispensing head. Note that "position" includes linear position as well as orientation of one component with respect to the other, and may be an absolute or relative quantity (for example, the position of a dispensing jet in the head relative to another jet in that head, or relative to the substrate). Parameters can be directly examined (such as by examining movement of the transport system or nozzle), or indirectly examined (such as by examining the actual results from previous depositions of the apparatus and comparing with expected results). Such examination can be made during formation of a given array, or obtained during (or from) previous depositions from the apparatus, for example either test depositions (sometimes referenced as "test prints") or a previous array deposition (such as an immediately preceding array deposition).

Another aspect of the method of the present invention, the target drive pattern is stored in a memory of the deposition apparatus, and when an error from a nominal value exists in at least one operating parameter, a corrected drive pattern is derived from the target drive pattern such that use of the corrected drive pattern results in a reduced discrepancy between the target and actual array patterns.

The present invention also provides an apparatus which, in one or more aspects, may be of a type described in connection with any of the above methods. Such an apparatus includes, in one aspect, a sensor which senses at least one operating parameter for an error from a nominal value which error will result in use of the target drive pattern producing a discrepancy between the target array pattern and an actual array pattern deposited. This apparatus also includes a processor which, when an error is detected by the sensor derives, based on the error, a corrected drive pattern different from the target drive pattern such that use of the corrected drive pattern results in a reduced discrepancy between the target and actual array patterns.

The apparatus may also include a memory accessible by the processor to save the target drive pattern, and wherein the processor, when no error is detected, causes the apparatus to operate in accordance with the target drive pattern. The processor may further optionally save a corrected drive pattern in the memory. Alternatively, the processor may derive the corrected drive pattern during deposition of the probes to form the array, by modifying, based on the detected error, instructions to at least one apparatus component based on the target drive pattern, as mentioned above. The apparatus may further include a dispensing head and a transport system controlled by the processor, as already described. Various parameters are also described above.

In another aspect, the apparatus includes a memory to store a target drive pattern based on nominal operating parameters of the apparatus to provide the probes on the substrate in the target array pattern. This aspect of the apparatus also includes a processor to receive an error indication of the type already described, and to derive the corrected drive pattern.

The present invention further provides a computer program product which can be used on one or more of the apparatus types already described. This computer program product includes a computer readable storage medium having a computer program stored on it which, when loaded into a computer, instructs the processor to execute the steps described above.

The present invention then, including methods, apparatus, and computer program products thereof, can provide any one or more, of a number of useful benefits. For example, arrays can be fabricated with an actual array pattern which is close to the target array pattern. Further, the invention is relatively reliable and not overly costly.

DETAILED DESCRIPTION OF EMBODIMENTS OF THE INVENTION

Figure 1:
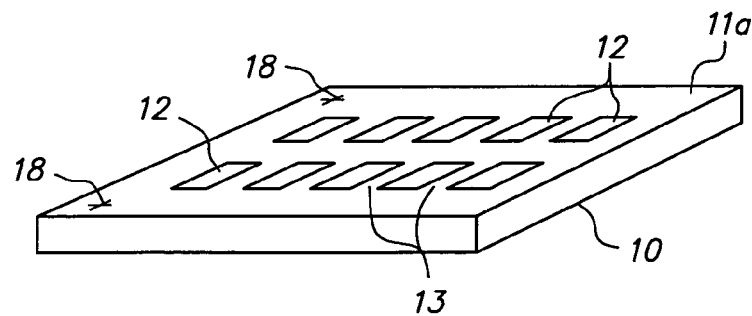
FIG. 1 is a perspective view of a substrate bearing multiple arrays, as may be produced by a method and apparatus of the present invention.

In the present application, unless a contrary intention appears, the following terms refer to the indicated characteristics. A "biopolymer" is a polymer of one or more types of repeating units. Biopolymers are found in biological systems and particularly include peptides or polynucleotides, as well as such compounds composed of or containing amino acid or nucleotide analogs or non-nucleotide groups. This includes polynucleotides in which the conventional backbone has been replaced with a non-naturally occurring or synthetic backbone, and nucleic acids in which one or more of the conventional bases has been replaced with a synthetic base capable of participating in Watson-Crick type hydrogen bonding interactions. Polynucleotides include single or multiple stranded configurations, where one or more of the strands may or may not be completely aligned with another. A "nucleotide" refers to a subunit of a nucleic acid and has a phosphate group, a 5 carbon sugar and a nitrogen containing base, as well as analogs of such subunits. Specifically, a "biopolymer" includes DNA (including cDNA), RNA and oligonucleotides. An "oligonucleotide" generally refers to a nucleotide multimer of about 10 to 100 nucleotides in length, while a "polynucleotide" includes a nucleotide multimer having any number of nucleotides. A "biomonomer" references a single unit, which can be linked with the same or other biomonomers to form a biopolymer (for example, a single amino acid or nucleotide with two linking groups one or both of which may have removable protecting groups). A biomonomer fluid or biopolymer fluid reference a liquid containing either a biomonomer or biopolymer, respectively (typically in solution). An "addressable array" includes any one or two dimensional arrangement of discrete regions (or "features") bearing particular biopolymer moieties (for example, different polynucleotide sequences) associated with that region and positioned at a particular location on the substrate (an "address"). These regions may or may not be separated by intervening spaces. It will also be appreciated that throughout the present application, words such as "upper", "lower" and the like are used with reference to a particular orientation of the apparatus with respect to gravity, but it will be understood that other operating orientations of the apparatus or any of its components, with respect to gravity, are possible. Reference to a "droplet" being dispensed from a pulse jet herein, merely refers to a discrete small quantity of fluid (usually less than about 1000 pL) being dispensed upon a single pulse of the pulse jet (corresponding to a single activation of an ejector) and does not require any particular shape of this discrete quantity. However, it will be understood that a given feature may be formed from one or multiple pulses from one or multiple nozzles. When a "spot" is referred to, this may reference a dried spot on the substrate resulting from drying of one or more dispensed droplets, or a wet spot on the substrate resulting from one or more dispensed droplets which have not yet dried, depending upon the context. The dried spot will normally be the resulting feature in the case of deposition of pre-synthesized biopolymer, but will not be the resulting feature in the case of in situ formation synthesis of biopolymers. Reference to "viewing" indicates observation by any optical device, such as a camera. The head or substrate moving "as" droplets are dispensed includes actual movement during and/or between the dispensing of multiple droplets. "Fluid" is used herein to reference a liquid. By one item being "remote" from another is referenced that they are at least in different buildings, and may be at least one, at least ten, or at least one hundred miles apart.

Figure 2:
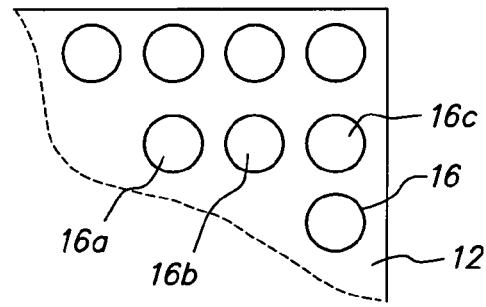
FIG. 2 is an enlarged view of a portion of FIG. 1 showing some of the identifiable individual regions (or "features") of a single array of FIG. 1.
Figure 3:
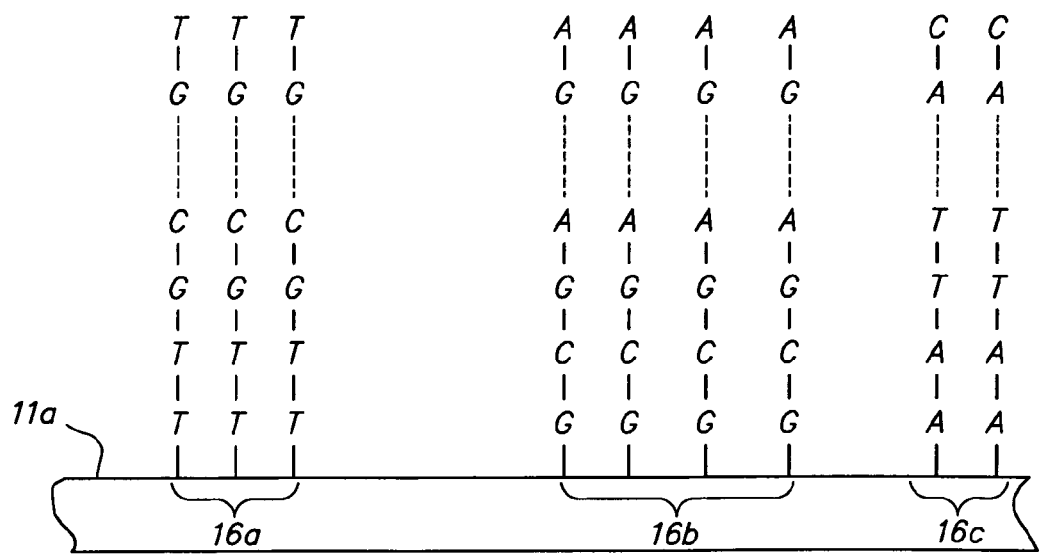
FIG. 3 is an enlarged cross-section of a portion of FIG. 2.

Referring first to FIGS. 1-3, typically the present invention will produce multiple identical arrays 12 (only some of which are shown in FIG. 1) across the complete upper surface 11a of a single substrate 10. However, the arrays 12 produced on a given substrate need not be identical and some or all could be different. Each array 12 will contain multiple spots or features 16. A typical array 12 may contain from 100 to 100,000 features. All of the features 16 may be different, or some or all could be the same. Each feature carries a predetermined polynucleotide having a particular sequence, or a predetermined mixture of polynucleotides. This is illustrated schematically in FIG. 3 where different regions 16 are shown as carrying different polynucleotide sequences. Substrate 10 also includes fiducial markings 18 on upper surface 11a, for purposes which will be described below. Fiducial markings 18 can be scratches, ink marks, metallized markings (for example, chromium) markers, laser ablated grooves, or any other suitable marking.

Figure 4:
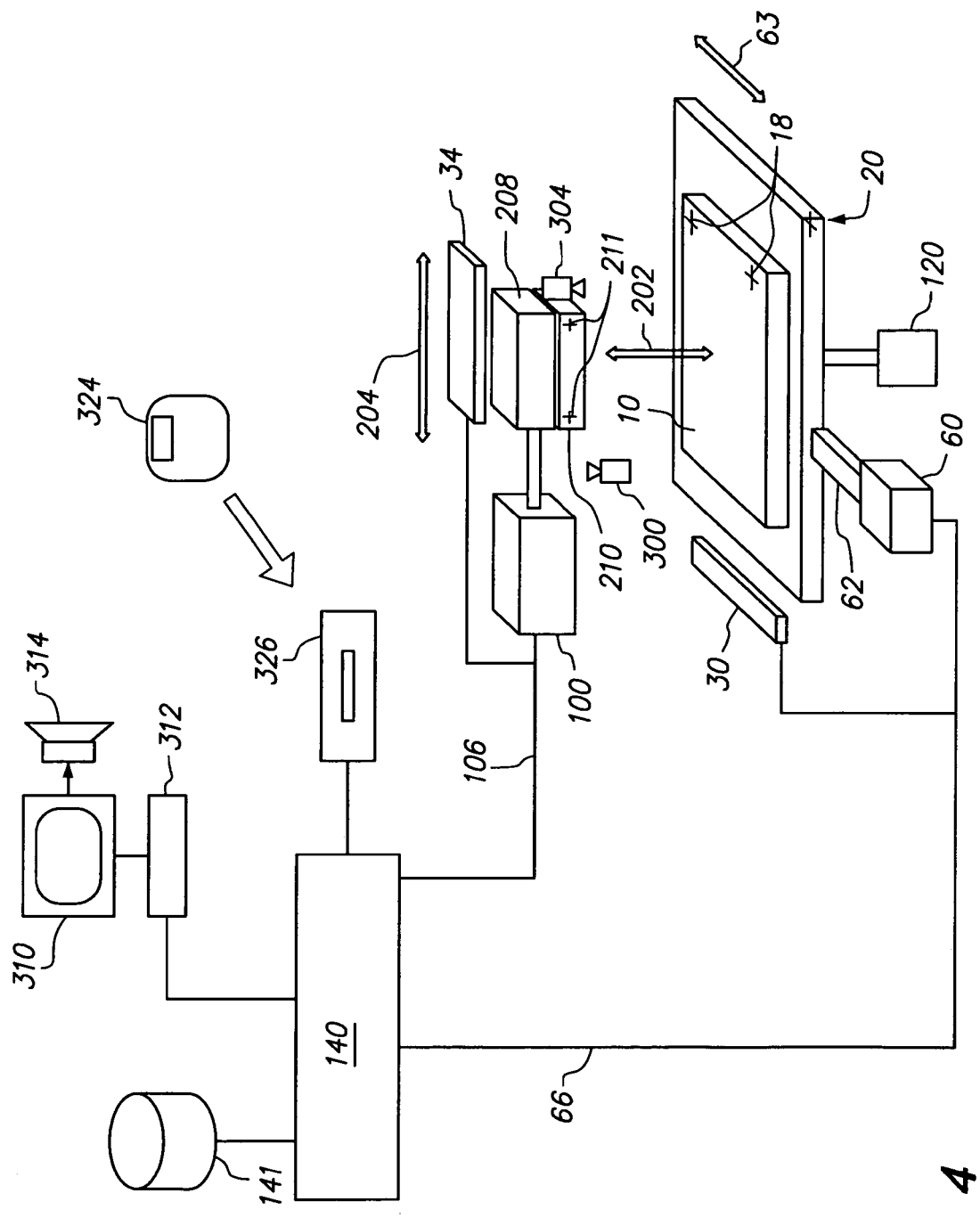
FIG. 4 is a schematic view of apparatus of the present invention.

Referring to FIG. 4 the apparatus shown includes a substrate station 20 on which can be mounted a substrate 10. Pins or similar means (not shown) can be provided on substrate station 20 by which to approximately align substrate 10 to a nominal position thereon. Substrate station 20 can include a vacuum chuck connected to a suitable vacuum source (not shown) to retain a substrate 10 without exerting too much pressure thereon, since substrate 10 is often made of glass.

A dispensing head 210 is retained by a head retainer 208. Head 210 has fiducial markings 211, for purposes described below, and can be positioned at any position facing substrate 10 by means of a positioning system. The positioning system includes a carriage 62 connected to a first transporter 60 controlled by processor 140 through line 66, and a second transporter 100 controlled by processor 140 through line 106. Transporter 60 and carriage 62 are used execute one axis positioning of station 20 (and hence mounted substrate 10) facing the dispensing head 210, by moving it in the direction of nominal axis 63, while transporter 100 is used to provide adjustment of the position of head retainer 208 (and hence head 210) in a direction of nominal axis 204. In this manner, head 210 can be scanned line by line, by scanning along a line over substrate 10 in the direction of axis 204 using transporter 100, while line by line movement of substrate 10 in a direction of axis 63 is provided by transporter 60. Head 210 may also optionally be moved in a vertical direction 202, by another suitable transporter (not shown). However, it will be appreciated that other scanning configurations could be used. However, it will be appreciated that both transporters 60 and 100, or either one of them, with suitable construction, could be used to perform the foregoing scanning of head 210 with respect to substrate 10. Thus, when the present application refers to "positioning" one element (such as head 210) in relation to another element (such as one of the stations 20 or substrate 10) it will be understood that any required moving can be accomplished by moving either element or a combination of both of them. An encoder 30 communicates with processor 140 to provide data on the exact location of substrate station 20 (and hence substrate 10 if positioned correctly on substrate station 20), while encoder 34 provides data on the exact location of holder 208 (and hence head 210 if positioned correctly on holder 208). Any suitable encoder, such as an optical encoder, may be used which provides data on linear position. Angular positioning of substrate station 20 is provided by a transporter 120, which can rotate substrate station 20 about axis 202 under control of processor 140. Typically, substrate station 20 (and hence a mounted substrate) is rotated by transporter 120 under control of processor 140 in response to an observed angular position of substrate 10 as determined by processor 140 through viewing one or more fiducial marks on substrate 10 (particularly fiducial marks 18) with camera 304. This rotation will continue until substrate 10 has reached a predetermined angular relationship with respect to dispensing head 210. In the case of a square or rectangular substrate, the mounted substrate 10 will typically be rotated to align one edge (length or width) with the scan direction of head 210 along axis 204.

Head 210 may be of a type commonly used in an ink jet type of printer and may, for example, have one hundred fifty drop dispensing orifices in each of two parallel rows, six chambers for holding polynucleotide solution communicating with the three hundred orifices, and three hundred ejectors which are positioned in the chambers opposite a corresponding orifice. Each ejector is in the form of an electrical resistor operating as a heating element under control of processor 140 (although piezoelectric elements could be used instead). Each orifice with its associated ejector and portion of the chamber, defines a corresponding pulse jet with the orifice acting as a nozzle. Thus, there are three hundred pulse jets in this configuration, although it will be appreciated that head 210 could, for example, have more or less pulse jets as desired (for example, at least ten or at least one hundred pulse jets). In this manner, application of a single electric pulse to an ejector causes a droplet to be dispensed from a corresponding orifice. In the foregoing configuration, typically about twenty orifices in each group of six reservoirs (many of the orifices are unused and are plugged with glue), will be dispensing the same fluid. Certain elements of the head 210 can be adapted from parts of a commercially available thermal inkjet print head device available from Hewlett-Packard Co. as part no. HP51645A. The foregoing head 210 and other suitable dispensing head designs are described in more detail in U.S. patent application entitled "A MULTIPLE RESERVOIR INK JET DEVICE FOR THE FABRICATION OF BIOMOLECULAR ARRAYS" Ser. No. 09/150,507 filed Sep. 9, 1998. However, other head configurations can be used, for example a head with thirty reservoirs, and even multiple heads can also be used as desired.

As is well known in the ink jet print art, the amount of fluid that is expelled in a single activation event of a pulse jet, can be controlled by changing one or more of a number of parameters, including the orifice diameter, the orifice length (thickness of the orifice member at the orifice), the size of the deposition chamber, and the size of the heating element, among others. The amount of fluid that is expelled during a single activation event is generally in the range about 0.1 to 1000 pL, usually about 0.5 to 500 pL and more usually about 1.0 to 250 pL. A typical velocity at which the fluid is expelled from the chamber is more than about 1 m/s, usually more than about 10 m/s, and may be as great as about 20 m/s or greater. As will be appreciated, if the orifice is in motion with respect to the receiving surface at the time an ejector is activated, the actual site of deposition of the material will not be the location that is at the moment of activation in a line-of-sight relation to the orifice, but will be a location that is predictable for the given distances and velocities.

The sizes of the features can have widths (that is, diameter, for a round spot) in the range from a minimum of about 10 μm to a maximum of about 1.0 cm. In embodiments where very small spot sizes or feature sizes are desired, material can be deposited according to the invention in small spots whose width is in the range about 1.0 μm to 1.0 mm, usually about 5.0 μm to 500 μm, and more usually about 10 μm to 200 μm. Spot sizes can be adjusted as desired, by using one or a desired number of pulses from a pulse jet to provide the desired final spot size.

The apparatus further includes a sensor in the form of a first camera 300 located to view fiducial markings on head 210 and/or the positions of the nozzles on head 210. Typical fiducial markings are shown as fiducial markings 211 on the side of head 210 for visibility, although in practice fiducial marks viewed by first camera 300 may be on the underside of head 210. A second sensor in the form of a second camera 304, is located to observe the positions of fiducial markings 18 on substrate. Cameras 300 and 304 communicate with processor 140, and each should have a resolution that provides a pixel size of about 1 to 100 micrometers and more typically about 4 to 20 micrometers or even 1 to 5 micrometers. Any suitable analog or digital image capture device (including a line by line scanner) can be used for such camera, although if an analog camera is used processor 140 should include a suitable analog/digital converter. Further, other numbers of cameras may be used. For example, a single camera with the correct orientation and parameters, could be used in place of cameras 300 and 304. A display 310, speaker 314, and operator input device 312, are further provided. Operator input device 312 may, for example, be a keyboard, mouse, or the like. Processor 140 has access to a memory 141, and controls print head 210 (specifically, the activation of the ejectors therein), operation of the positioning system, operation of each jet in print head 210, capture of images from the cameras, and operation display 310 and speaker 314. Memory 141 may be any suitable device in which processor 140 can store and retrieve data, such as magnetic, optical, or solid state storage devices (including magnetic or optical disks or tape or RAM, or any other suitable device, either fixed or portable). Processor 140 may include a general purpose digital microprocessor suitably programmed from a computer readable medium carrying necessary program code, to execute all of the functions required of it as described below. It will be appreciated though, that when a "processor" such as processor 140 is referenced throughout this application, that such includes any hardware and/or software combination which will perform the required functions. For example, for errors in the transport system, a corrected drive pattern can be produced by programming a device such as the Programmable Error Correction PKE 80, available form RSF Electronik, Rancho Cordova, Calif., USA, with measured error data obtained from examining the transport system of the deposition apparatus. A microprocessor which provides the target drive pattern, together with the foregoing programmed device, then operates as a "processor" of the present invention. The programming can be provided remotely to processor 140, or previously saved in a computer program product such as memory 141 or some other portable or fixed computer readable storage medium using any of those devices mentioned below in connection with memory 141. For example, a magnetic or optical disk 324 may carry the programming, and can be read by disk reader 326.

Figure 5:
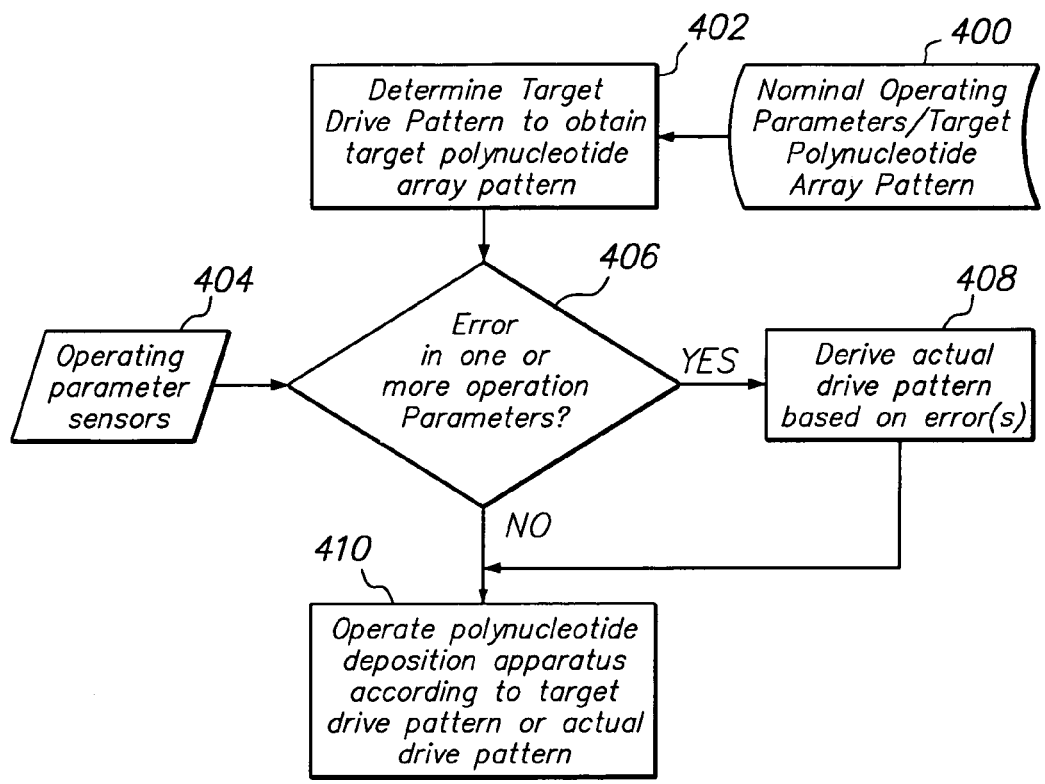
FIG. 5 is a flowchart illustrating a method of the present invention.

Operation of the apparatus of FIG. 4 in accordance with a method of the present invention, will now be described with reference to that FIG. and FIG. 5. First, it will be assumed that memory 141 holds a target drive pattern. This target drive pattern is the instructions for driving the apparatus components as required to form the target array (which includes target locations and dimension for each spot) on substrate 10 and includes, for example, movement commands to transporters 60 and 100 as well as firing commands for each of the pulse jets in head 210 coordinated with the movement of head 210 and substrate 10, as well as instructions for which polynucleotide solution (or precursor) is to be loaded in each pulse jet (that is, the "loading pattern"). This target drive pattern is based upon the target array pattern and can have either been input from an appropriate source (such as input device 312, a portable magnetic or optical medium, or from a remote server, any of which communicate with processor 140), or may have been determined (402) by processor 140 based upon an input target array pattern (using any of the appropriate sources previously mentioned) and the previously known nominal operating parameters of the apparatus (400). Further, it will be assumed that drops of different biomonomer or biopolymer containing fluids (or other fluids) have been placed at respective regions of a loading station (not shown). Operation of the following sequences are controlled by processor 140, following initial operator activation, unless a contrary indication appears.

For any given substrate 10, the operation is basically follows: (i) determine (402) target drive pattern (if not already provided) to obtain target array pattern, based on nominal operating parameters and target polynucleotide array pattern; (ii) examine (406) operating parameter data (404) from sensors 300, 304 for an error from a nominal value, which error will result in use of the target drive pattern producing a discrepancy between the target array pattern and an actual array pattern which would be deposited if the target drive pattern was used; (iii) if there is no error in one or more operating parameters (406) then the apparatus is operated according to the target drive pattern; (iv) if there is an error in one or more operating parameters (406) then processor 140 derives, based on the error, a corrected drive pattern from the target pattern such that use of the corrected drive pattern results in a reduced discrepancy between the target and actual array patterns than would have occurred if the target drive pattern had been used.

It will be appreciated that any discrepancy between a nominal parameter and an actual sensed parameter, may optionally only be classified as an "error" in an operating parameter, if it meets or exceeds a predetermined threshold value. Particular examples of operating parameter errors which may occur in the apparatus of FIG. 4 include any one or more of the following:

1. Substrate 10 may be incorrectly positioned with respect to encoder 30 or encoder 34.
2. Head 210 may be incorrectly positioned with respect to encoder 34 or, where there are multiple heads 210 in the apparatus, one or more of them may be incorrectly positioned with respect to each other.
3. Head 210 may be skewed (orientation error), and thus its nozzles vary from their desired positions and/or orientations with respect to encoder 34.
4. Either encoder 30, 34 may have intrinsic errors, due to which it will report an incorrect position.
5. Either substrate 10 or either encoder 30, 34 may suffer from thermal expansion.
6. The transporter 60 and carriage 62 used to move the substrate in the direction of nominal axis 63 (orthogonal to the direction 204 of scanning of head 210) may also have intrinsic errors, suffer from thermal expansion, or operate at a deviation to nominal axis 63 (a non-straight deviation in the direction of axis 204 and/or a non-flat deviation in the direction of axis 202). In addition, component imperfections may cause the transport to suffer from Abbe errors.
7. The nozzles of head 210 may fire at an angle to that intended. The above operating parameter errors can be sensed and used by processor 140 to derive an actual drive map as follows:
    1. The actual position of substrate 10 can be determined by observation of fiducial marks 18 by camera 304. If different substrates are repeatedly placed on substrate station 20, this error can be determined each time it is placed.
    2. The position of head 210 can be determined by observation of fiducial marks 211 and/or the nozzles themselves by camera 300. In a preferred embodiment, the same camera is used for this observation and observation of substrate fiducials 18, this scheme having the advantage that no inter-camera calibration is required.
    3. Same as in 2.
    4. Laser-interferometer mapping of the errors in the encoders is a method well established in the art, and will provide a measurement of the relative error at many points along the encoder.
    5. Thermal expansion can be measured by repeated observation of substrate fiducial marks 18 by camera 304, and by repeated observation of head fiducial marks 211 after movement by camera 300 or optionally by two cameras. Alternatively, a thermistor could be used and an expected thermal expansion calculated.
    6. Errors in operation of transporter 60 and carriage 62 can be mapped by means of camera 304, and thermal expansion mapped by observation of fiducial marks on carriage 62 by a camera (or optionally two cameras). Non-straightness and or flatness can be determined by laser interferometry. Laser interferometry mapping of Abbe errors in a transport system generally, is a known technique.
    7. Test-print patterns can be observed with a camera (such as camera 304) to observe drop placement. Suitable observations techniques are described, for example, in co-pending U.S. patent application Ser. No. 09/302,898 filed Apr. 30, 1999 by Caren et al., assigned to the same assignee as the present application, incorporated herein by reference.

The apparatus is then operated (410) as follows: (a) load head 210 with a first set of polynucleotide containing solutions or their precursors (for example, a given head may be able to hold n different members); (b) dispense droplets from head 210 onto substrate 10 or a set of substrates in accordance with the target or corrected drive patterns to provide the target array pattern for the first set on each of multiple arrays 12; and (c) repeat the foregoing sequence starting at step (i) with a second set and subsequent sets of polynucleotide containing solutions or their precursors, until all required solutions have been dispensed onto substrate 10 (for example, if each array has m-n members, and presynthesized polynucleotides are being dispensed, then the sequence will be repeated m times). Optionally, as another means of providing operating parameter data, the deposited arrays can be inspected by capturing one or more images such as from camera 304 and comparing the deposited array pattern with the target array pattern. Differences in the foregoing may indicate particular types of errors (for example, a single nozzle of head 210 is oriented incorrectly with respect to other nozzles of head 210). For example, an inspection could be performed on after step (b) in each cycle. Preferably, all arrays on a given substrate 10 have been inspected before shipping to an end user. The foregoing steps are discussed in more detail below.

Figure 6:
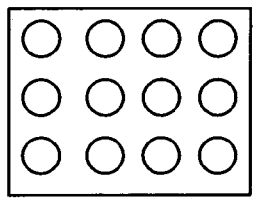
FIG. 6 through 8 are memory images illustrating the operation of the present invention.
Figure 7:
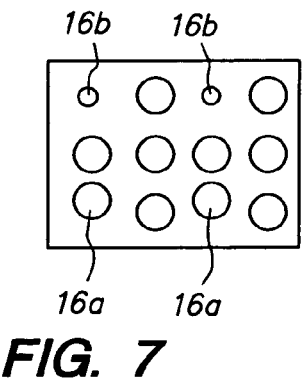
Figure 8:
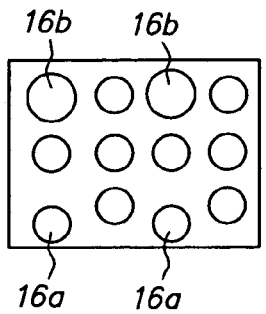

The manner of correction provided by processor 140 can be more readily understood by reference to FIGS. 6 through 8. In particular, FIG. 6 represents an image in memory 141 of a portion of the target drive pattern. It will be assumed that this pattern is created by a dispensing head with a three by two matrix of dispensing jets (oriented with three jets in the vertical direction of FIGS. 6-8 and two in the horizontal direction), thus requiring a firing of all jets, followed by head displacement and another firing of all jets. Hence FIG. 6 corresponds to the appearance of the target array pattern if all relevant components of the deposition apparatus are operating according to their normal parameters ("operating" in this context includes correct positioning, whether static or dynamic). However, from observations of previous test prints by camera 300, processor 140 determines there is an error in relative orientation of the nozzle of head 210 which produces spots 16*a*. Similarly, an error is determined in fluid volumes deposited by the nozzle of head 210 which produces spots 16*b*. Processor 140 then derives a corrected drive pattern, the image in memory of the corrected drive pattern being illustrated in FIG. 6. This corrected drive pattern incorporates an inverse of the determined errors. That is, in order to correct for displacement (in the upward direction as viewed in FIG. 7) of spots 16*a*, the actual drive image will contain an instruction to move the head lower (as viewed in FIG. 8) than the nominal position of FIG. 6 to compensate for the displacement in FIG. 7. Similarly, to correct for the below expected volume (that is, the nominal volume) produced by the jets producing features 16*b*, the actual drive image will contain an instruction for that jet to fire multiple spots or with more energy (this appearing as enlarged features 16*b* in FIG. 8) to compensate for the low volume error. Alternatively, the actual drive image can be an instruction to switch to a different jet in the head when a deviation from nominal volume is encountered which may be more than a predetermined tolerance, and to compensate for the different position of the different jet accordingly. While the illustrated errors in FIG. 7 relate to individual spots, other errors can be general in that they relate to all spots. For example, an error in the position of substrate 10 on substrate station 20 is a general error, and the corrected drive pattern could be the same as the target drive pattern but with the addition of a set of offset instructions to the positioning system, such as a single instruction to one or any combination of transporters 60, 100, 120, to offset the position system from nominal to compensate for this error.

A loading sequence for head 210 is more completely described in co-pending patent applications "FABRICATING BIOPOLYMER ARRAYS", by Caren et al., Ser. No. 09/302,922, and "PREPARATION OF BIOPOLYMER ARRAYS" by A. Schleifer et al., Ser. No. 09/302,899, both filed Apr. 30, 1999 and both assigned to the same assignee as the present application, and the references cited therein, including the possibility of using a flexible microtitre plate as described in U.S. patent application "Method and Apparatus for Liquid Transfer", Ser. No. 09/183,604. Those references and all other references cited in the present application, are incorporated into this application by reference. Processor 140 can control pressure within head 210 to load each polynucleotide solution into the chambers in the head by drawing it through the orifices.

Substrate 10 is loaded onto substrate station 20 either manually by an operator, or optionally by a suitable automated driver (not shown) controlled, for example, by processor 140.

The deposition sequence is then initiated to deposit the desired arrays of polynucleotide containing fluid droplets on the substrate to provide dried drops on the substrate according to the target pattern each with respective feature locations and dimensions. As already mentioned, in this sequence processor 140 will operate the apparatus according to the target or corrected drive pattern, by causing the positioning system to position head 210 facing substrate station 20, and particularly the mounted substrate 10, and with head 210 at an appropriate distance from substrate 10. Processor 140 then causes the positioning system to scan head 210 across substrate 10 line by line (or in some other desired pattern), while coordinating activation of the ejectors in head 210 so as to dispense droplets in accordance with the target pattern. If necessary or desired, processor 140 can repeat the load and dispensing sequences one or more times until head 210 has dispensed droplets in accordance with the target or corrected drive pattern for all arrays 12 to be formed on substrate 10. The number of spots in any one array 12 can, for example, be at least ten, at least one hundred, at least one thousand, or even at least one hundred thousand.

At this point the droplet dispensing sequence is complete.

In an alternative to the above described embodiment the corrected drive pattern, instead of being derived prior to beginning deposition of droplets, may be created "on the fly". In one way of accomplishing this, the corrected drive pattern is created by modifying, based on the detected error, instructions to at least one deposition apparatus component which were based on the target drive pattern. This is done during the deposition of the probes or probe precursors. For example, the encoders 34 may be of a type which simply sends a pulse to the head at a certain spatial frequency; on each such pulse, the image file instructs the drive electronics which nozzles should be fired. Instead of deriving a corrected drive pattern in memory 141 so that the encoder pulses will cause accurate printing, the encoder signals may be processed by processor 140 to cause a non-distorted image to print accurately.

It is preferable in an apparatus, method, or computer program of the present invention, to not actually derive a target drive pattern from a target array pattern, but instead to simply derive a corrected drive pattern from the target pattern, nominal conditions and detected error, when an error is detected. This can be done before fabrication of a given array has started at least when the error is detected before such fabrication has started (for example, as a result of examining an operating parameter by examining a previously fabricated array), or during such fabrication. Again, the target drive pattern may be saved in memory or just derived during the actual array fabrication and sent as instructions directly to the apparatus components.

The present methods and apparatus may be used to deposit biopolymers or other moieties on surfaces of any of a variety of different substrates, including both flexible and rigid substrates. Preferred materials provide physical support for the deposited material and endure the conditions of the deposition process and of any subsequent treatment or handling or processing that may be encountered in the use of the particular array. The array substrate may take any of a variety of configurations ranging from simple to complex. Thus, the substrate could have generally planar form, as for example a slide or plate configuration, such as a rectangular or square or disc. In many embodiments, the substrate will be shaped generally as a rectangular solid, having a length in the range about 4 mm to 1 m, usually about 4 mm to 600 mm, more usually about 4 mm to 400 mm; a width in the range about 4 mm to 1 m, usually about 4 mm to 500 mm and more usually about 4 mm to 400 mm; and a thickness in the range about 0.01 mm to 5.0 mm, usually from about 0.1 mm to 2 mm and more usually from about 0.2 to 1 mm. However, larger substrates can be used, particularly when such are cut after fabrication into smaller size substrates carrying a smaller total number of arrays 12.

In the present invention, any of a variety of geometries of arrays on a substrate 10 may be fabricated other than the organized rows and columns of arrays 12 of FIG. 1. For example, arrays 12 can be arranged in a series of curvilinear rows across the substrate surface (for example, a series of concentric circles or semi-circles of spots), and the like. Similarly, the pattern of regions 16 may be varied from the organized rows and columns of spots in FIG. 2 to include, for example, a series of curvilinear rows across the substrate surface(for example, a series of concentric circles or semi-circles of spots), and the like. Even irregular arrangements of the arrays or the regions within them can be used, at least when some means is provided such that during their use the locations of regions of particular characteristics can be determined (for example, a map of the regions is provided to the end user with the array). The configuration of the arrays and their features may be selected according to manufacturing, handling, and use considerations.

The substrates may be fabricated from any of a variety of materials. In certain embodiments, such as for example where production of binding pair arrays for use in research and related applications is desired, the materials from which the substrate may be fabricated should ideally exhibit a low level of non-specific binding during hybridization events. In many situations, it will also be preferable to employ a material that is transparent to visible and/or UV light. For flexible substrates, materials of interest include: nylon, both modified and unmodified, nitrocellulose, polypropylene, and the like, where a nylon membrane, as well as derivatives thereof, may be particularly useful in this embodiment. For rigid substrates, specific materials of interest include: glass; plastics (for example, polytetrafluoroethylene, polypropylene, polystyrene, polycarbonate, and blends thereof, and the like); metals (for example, gold, platinum, and the like).

The substrate surface onto which the polynucleotide compositions or other moieties is deposited may be smooth or substantially planar, or have irregularities, such as depressions or elevations. The surface may be modified with one or more different layers of compounds that serve to modify the properties of the surface in a desirable manner. Such modification layers, when present, will generally range in thickness from a monomolecular thickness to about 1 mm, usually from a monomolecular thickness to about 0.1 mm and more usually from a monomolecular thickness to about 0.001 mm. Modification layers of interest include: inorganic and organic layers such as metals, metal oxides, polymers, small organic molecules and the like. Polymeric layers of interest include layers of: peptides, proteins, polynucleic acids or mimetics thereof (for example, peptide nucleic acids and the like); polysaccharides, phospholipids, polyurethanes, polyesters, polycarbonates, polyureas, polyamides, polyethyleneamines, polyarylene sulfides, polysiloxanes, polyimides, polyacetates, and the like, where the polymers may be hetero- or homopolymeric, and may or may not have separate functional moieties attached thereto (for example, conjugated), Various modifications to the embodiments of the particular embodiments described above are, of course, possible. Accordingly, the present invention is not limited to the particular embodiments described in detail above.

What is claimed is:

1. A method of fabricating an addressable array of biopolymer probes on a substrate according to a target array pattern using a deposition apparatus which, when operated according to a target drive pattern based on nominal operating parameters of the apparatus and determined by a processor in communication with the deposition apparatus, provides the probes on the substrate in the target array pattern, the method comprising:
　(a) examining at least one operating parameter for an error from a nominal value which error will result in use of the target drive pattern producing a discrepancy between the target array pattern and an actual array pattern deposited;
　(b) when an error is detected deriving, based on the error, a corrected drive pattern different from the target drive pattern such that use of the corrected drive pattern results in a reduced discrepancy between the target and actual array patterns; and
　(c) operating the deposition apparatus according to the corrected drive pattern so as to fabricate the array;
　wherein;
　the deposition apparatus includes a dispensing head to dispense fluid droplets containing the probes or probe precursors, and a transport system to move at least one of the dispensing head and substrate relative to the other as the droplets are dispensed from the head, so as to form the array;
　the drive pattern controls operation of the transport system; and
　the operating parameter is the position of the dispensing head, which is examined by viewing the dispensing head.

2. A method according to claim 1 wherein the operating parameter is examined by viewing a fiducial mark on the dispensing head.

3. A method of fabricating an addressable array of biopolymer probes on a substrate according to a target array pattern using a deposition apparatus which, when operated according to a target drive pattern based on nominal operating parameters of the apparatus and determined by a processor in communication with the deposition apparatus, provides the probes on the substrate in the target array pattern, the method comprising:
　(a) examining at least one operating parameter for an error from a nominal value which error will result in use of the target drive pattern producing a discrepancy between the target array pattern and an actual array pattern deposited;
　(b) when an error is detected deriving, based on the error, a corrected drive pattern different from the target drive pattern such that use of the corrected drive pattern results in a reduced discrepancy between the target and actual array patterns; and
　(c) operating the deposition apparatus according to the corrected drive pattern so as to fabricate the array;
　wherein:
　the deposition apparatus includes a dispensing head with multiple nozzles to dispense fluid droplets containing the probes or probe precursors, and a transport system to move at least one of the dispensing head and substrate relative to the other as the droplets are dispensed from the head, so as to form the array;

the drive pattern controls operation of the transport system;

the at least one operating parameter is the position of the substrate or dispensing head, or orientation of a nozzle, and is examined by viewing the dispensing head, or nozzle, or a droplet pattern previously dispensed from the head.

4. A method according to claim 3, additionally comprising operating the deposition apparatus according to the corrected drive pattern.

5. A method according to claim 3 wherein the probes are DNA or RNA probes.

6. A method according to claim 3 additionally comprising saving the target drive pattern in a memory of the deposition apparatus.

7. A method according to claim 6 additionally comprising saving the target drive pattern in a memory of a processor in communication with the deposition apparatus, and wherein the corrected drive pattern is saved in the memory, prior to operating the dispensing head and transport system to form the array.

8. A method according to claim 6 additionally comprising saving the target drive pattern in a memory of a processor in communication with the deposition apparatus, and wherein the corrected drive pattern is derived by modifying, based on the detected error, instructions to at least one deposition apparatus component based on the target drive pattern during operation of the dispensing head and transport system to form the array.

9. A method according to claim 3 additionally comprising saving the target drive pattern in a memory of the deposition apparatus, and wherein the corrected drive pattern is saved in the memory.

10. A method according to claim 3 wherein the at least one operating parameter is examined by viewing the droplet pattern previously dispensed from the head.

11. A method according to claim 3 wherein the at least one operating parameter is a position of the dispensing head.

12. A method according to claim 3 wherein the same error affects less than all of the array features.

13. A method of fabricating an addressable array of biopolymer probes on a substrate according to a target array pattern using a deposition apparatus which, when operated according to a target drive pattern based on nominal operating parameters of the apparatus and determined by a processor in communication with the deposition apparatus, provides the probes on the substrate in the target array pattern, the method comprising:

(a) examining at least one operating parameter for an error from a nominal value which error will result in use of the target drive pattern producing a discrepancy between the target array pattern and an actual array pattern deposited;

(b) when an error is detected deriving, based on the error, a corrected drive pattern different from the target drive pattern such that use of the corrected drive pattern results in a reduced discrepancy between the target and actual array patterns; and (c) operating the deposition apparatus according to the corrected drive pattern so as to fabricate the array; wherein:

the deposition apparatus includes a dispensing head with multiple nozzles to dispense fluid droplets containing the probes or probe precursors, and a transport system to move at least one of the dispensing head and substrate relative to the other as the droplets are dispensed from the head, so as to form the array;

the drive pattern controls operation of the transport system;

and wherein the at least one parameter is a position of a nozzle which is examined by viewing the nozzle, or a droplet pattern previously dispensed from the head.

14. A method of fabricating an addressable array of biopolymer probes on a substrate according to a target array pattern using a deposition apparatus which, when operated according to a target drive pattern based on nominal operating parameters of the apparatus and determined by a processor in communication with the deposition apparatus, provides the probes on the substrate in the target array pattern, the method comprising:

(a) examining at least one operating parameter for an error from a nominal value which error will result in use of the target drive pattern producing a discrepancy between the target array pattern and an actual array pattern deposited;

(b) when an error is detected deriving, based on the error, a corrected drive pattern different from the target drive pattern such that use of the corrected drive pattern results in a reduced discrepancy between the target and actual array patterns; and (c) operating the deposition apparatus according to the corrected drive pattern so as to fabricate the array;

wherein the operating parameter is a fluid volume dispensed by the deposition apparatus.

15. A method according to claim 14 wherein the deposition apparatus comprises multiple jets for dispensing droplets, and wherein the corrected pattern is provided by a processor in communication with the deposition apparatus which provides an instruction to switch to a different jet when a deviation from nominal volume is encountered for one jet which is more than a predetermined tolerance.

16. A method of fabricating an addressable array of biopolymer probes on a substrate according to a target array pattern using a deposition apparatus which, when operated according to a target drive pattern based on nominal operating parameters of the apparatus and determined by a processor in communication with the deposition apparatus, provides the probes on the substrate in the target array pattern, the method comprising:

(a) examining at least one operating parameter for an error from a nominal value which error will result in use of the target drive pattern producing a discrepancy between the target array pattern and an actual array pattern deposited;

(b) when an error is detected deriving, based on the error, a corrected drive pattern different from the target drive pattern such that use of the corrected drive pattern results in a reduced discrepancy between the target and actual array patterns; and (c) operating the deposition apparatus according to the corrected drive pattern so as to fabricate the array;

wherein the operating parameter is a position of a component which varies due to thermal expansion.

17. A method of fabricating an addressable array of biopolymer probes on a substrate according to a target array pattern using a deposition apparatus which, when operated according to a target drive pattern based on nominal operating parameters of the apparatus and determined by a processor in communication with the deposition apparatus, provides the probes on the substrate in the target array pattern, the method comprising:

(a) examining at least one operating parameter for an error from a nominal value which error will result in use of the target drive pattern producing a discrepancy between the target array pattern and an actual array pattern deposited, (b) when an error is detected deriving, based on the error, a corrected drive pattern different from the target drive pattern such that use of the corrected drive pattern results in a reduced discrepancy between the target and actual array patterns; and (c) operating the deposition apparatus according to the corrected drive pattern so as to fabricate the array;

wherein:

the deposition apparatus includes a dispensing head to dispense fluid droplets containing the probes or probe precursors, and a transport system to move at least one of the dispensing head and substrate relative to the other as the droplets are dispensed from the head, so as to form the array;

the apparatus further includes an encoder to provide data on the location of the substrate or head; and the at least one operating parameter is an encoder error.

18. A method of fabricating an addressable array of biopolymer probes on a substrate according to a target array pattern using a deposition apparatus which, when operated according to a target drive pattern based on nominal operating parameters of the apparatus and determined by a processor in communication with the deposition apparatus, provides the probes on the substrate in the target array pattern, the method comprising:

(a) examining at least one operating parameter for an error from a nominal value which error will result in use of the target drive pattern producing a discrepancy between the target array pattern and an actual array pattern deposited;

(b) when an error is detected deriving, based on the error, a corrected drive pattern different from the target drive pattern such that use of the corrected drive pattern results in a reduced discrepancy between the target and actual array patterns; and (c) operating the deposition apparatus according to the corrected drive pattern so as to fabricate the array;

wherein:

the deposition apparatus includes a dispensing head with multiple nozzles to dispense fluid droplets containing the probes or probe precursors, and a transport system to move at least one of the dispensing head and substrate relative to the other as the droplets are dispensed from the head, so as to form the array;

the drive pattern controls operation of the transport system;

the operating parameter is the position of the dispensing head, or orientation of a nozzle, and is examined by viewing the dispensing head, or nozzle.

19. A method of fabricating an addressable array of biopolymer probes on a substrate according to a target array pattern using a deposition apparatus which, when operated according to a target drive pattern based on nominal operating parameters of the apparatus and determined by a processor in communication with the deposition apparatus, provides the probes on the substrate in the target array pattern, the method comprising:

(a) examining at least one operating parameter for an error from a nominal value which error will result in use of the target drive pattern producing a discrepancy between the target array pattern and an actual array pattern deposited;

(b) when an error is detected deriving, based on the error, a corrected drive pattern different from the target drive pattern such that use of the corrected drive pattern results in a reduced discrepancy between the target and actual array patterns; and (c) operating the deposition apparatus according to the corrected drive pattern so as to fabricate the array;

wherein the same error affects less than all of the array features.

* * * * *